US008003258B2

(12) United States Patent
Issaev et al.

(10) Patent No.: US 8,003,258 B2
(45) Date of Patent: Aug. 23, 2011

(54) ALKALINE CELL WITH IMPROVED ANODE

(75) Inventors: Nikolai N. Issaev, Woodbridge, CT (US); Michael Pozin, Brookfield, CT (US)

(73) Assignee: The Gillette Company, Boston, MA (US)

( * ) Notice: Subject to any disclaimer, the term of this patent is extended or adjusted under 35 U.S.C. 154(b) by 1071 days.

(21) Appl. No.: 11/334,857

(22) Filed: Jan. 19, 2006

(65) Prior Publication Data
US 2007/0166620 A1    Jul. 19, 2007

(51) Int. Cl.
H01M 4/62 (2006.01)
H01M 4/42 (2006.01)
H01M 4/50 (2006.01)

(52) U.S. Cl. ............ 429/232; 429/231.6; 429/231.9; 429/224; 429/206; 429/229

(58) Field of Classification Search ............ 429/232, 429/229
See application file for complete search history.

(56) References Cited

U.S. PATENT DOCUMENTS

| 3,379,569 | A |  | 4/1968 | Berger et al. |  |
|---|---|---|---|---|---|
| 3,379,570 | A |  | 4/1968 | Berger et al. |  |
| 4,287,268 | A | * | 9/1981 | Coetzer ............... | 429/103 |
| 4,287,269 | A | * | 9/1981 | Coetzer et al. ........ | 429/103 |
| 5,240,793 | A |  | 8/1993 | Glaeser |  |
| 5,342,712 | A |  | 8/1994 | Mieczkowska |  |
| 5,721,072 | A |  | 2/1998 | Mototani et al. |  |
| 6,207,322 | B1 | * | 3/2001 | Kelsey et al. ........ | 429/206 |
| 7,771,496 | B1 | * | 8/2010 | Nakahara et al. ...... | 29/623.1 |
| 2002/0177043 | A1 |  | 11/2002 | Ndzebet |  |
| 2004/0146783 | A1 | * | 7/2004 | Alday Lesaga et al. .. | 429/224 |
| 2004/0166412 | A1 | * | 8/2004 | Bugnet et al. ......... | 429/229 |
| 2004/0187640 | A1 | * | 9/2004 | Melzer et al. .......... | 75/255 |
| 2004/0265683 | A1 | * | 12/2004 | Merrill et al. ........... | 429/56 |
| 2006/0257734 | A1 | * | 11/2006 | Obata et al. ............ | 429/206 |

FOREIGN PATENT DOCUMENTS

JP            2005-317266      * 11/2005

OTHER PUBLICATIONS

Kuznick et al. "A titanosilicatemolecular sieve with adjustable pores for size-selective adsorption of molecules", Nature,vol. 412 (2001).*
Mark E. Davis, "Zeolites and Molecular Sieves: Not Just Ordinary Catalysts", Znd. Eng. Chem. Res. 1991,30, 1675-1683.*
JP-2005-317266-Translation.*
PCT International Search Report, date mailed: Jun. 14, 2007, 4 pages.

* cited by examiner

Primary Examiner — Patrick Ryan
Assistant Examiner — Ladan Mohaddes
(74) Attorney, Agent, or Firm — Vladimir Vitenberg

(57) ABSTRACT

An alkaline cell having an anode mixture comprising zinc particles, aqueous alkaline electrolyte, and molecular sieve additive. The cathode preferably comprises manganese dioxide. The cell may be cylindrical or any other shape or size. The molecular sieve additive preferably comprises a crystalline aluminosilicate material which is in at least a partially dehydrated state before admixture with the aqueous electrolyte, preferably potassium hydroxide. The aluminosilicate crystalline structure has average pore size between about 3 and 25 Angstrom. The addition of the molecular sieves to the zinc anode improves the cell's discharge capacity and service life. The molecular sieves preferably comprises between about 0.07 and 0.7 percent by weight of the anode mixture.

15 Claims, 1 Drawing Sheet

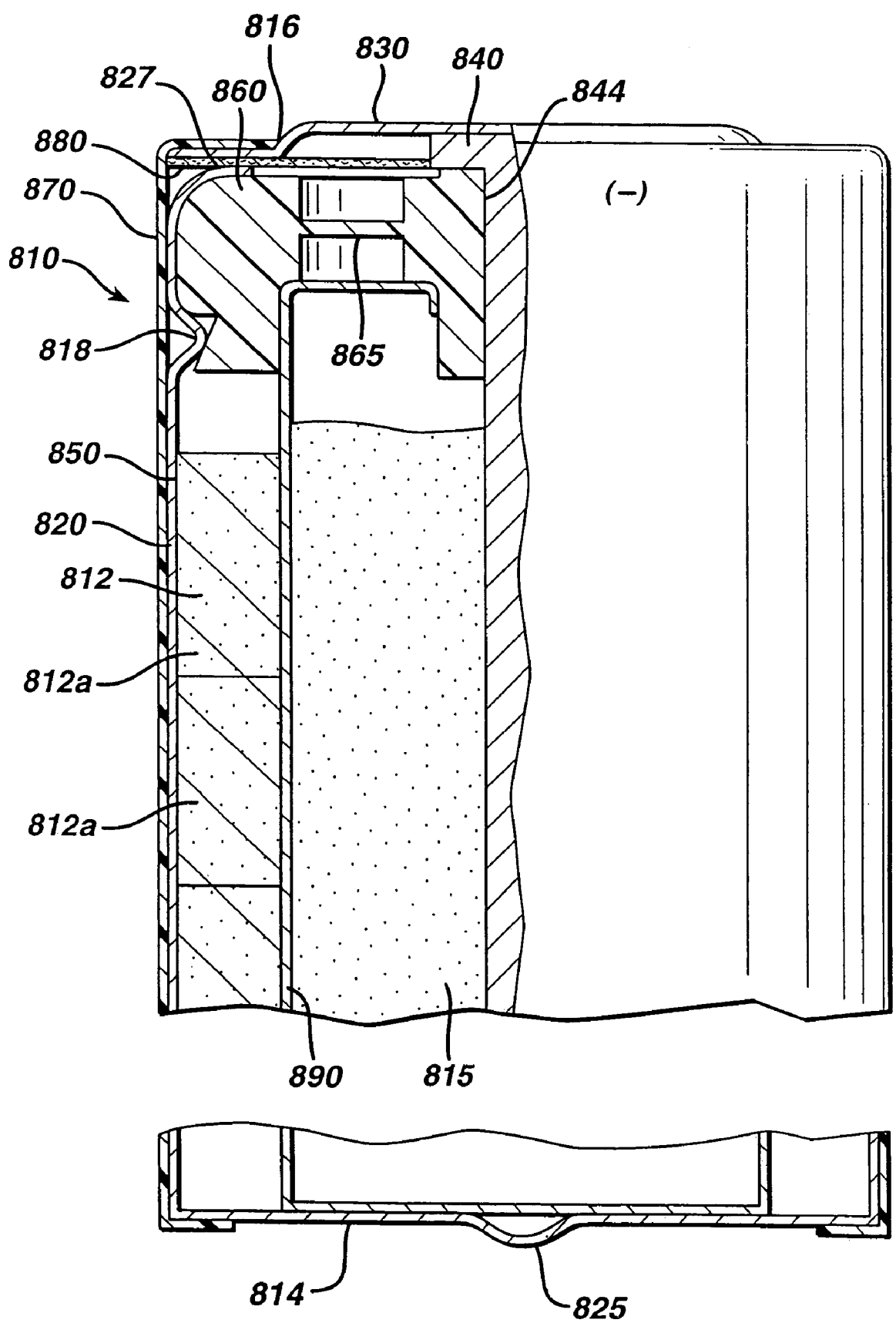

ALKALINE CELL WITH IMPROVED ANODE

FIELD OF THE INVENTION

This invention relates to an aqueous alkaline cell with an anode comprising zinc and a cathode comprising manganese dioxide with molecular sieve (dehydrated zeolite, dehydrated alkali metal aluminosilicate) material added to the anode to improve the cell's discharge capacity and service life.

BACKGROUND OF THE INVENTION

Conventional alkaline electrochemical cells have an anode comprising zinc and a cathode comprising manganese dioxide. The cell is typically formed of a cylindrical casing. The casing is initially formed with an enlarged open end and opposing closed end. After the cell contents are supplied, an end cap with insulating plug is inserted into the open end. The cell is closed by crimping the casing edge over an edge of the insulating plug and radially compressing the casing around the insulating plug to provide a tight seal. A portion of the cell casing at the closed end forms the positive terminal.

Primary alkaline electrochemical cells typically include a zinc anode active material, an alkaline electrolyte, a manganese dioxide cathode active material, and an electrolyte permeable separator film, typically of cellulose or cellulosic and polyvinylalcohol fibers. The anode active material can include for example, zinc particles admixed with conventional gelling agents, such as sodium carboxymethyl cellulose or the sodium salt of an acrylic acid copolymer, and an electrolyte. The gelling agent serves to suspend the zinc particles and to maintain them in contact with one another. Typically, a conductive metal nail inserted into the anode active material serves as the anode current collector, which is electrically connected to the negative terminal end cap. The electrolyte can be an aqueous solution of an alkali metal hydroxide for example, potassium hydroxide, sodium hydroxide or lithium hydroxide. The cathode typically includes particulate manganese dioxide as the electrochemically active material admixed with an electrically conductive additive, typically graphite material, to enhance electrical conductivity. Optionally, small amount of polymeric binders, for example polyethylene binder and other additives, such as titanium-containing compounds can be added to the cathode.

The manganese dioxide used in the cathode is preferably electrolytic manganese dioxide (EMD) which is made by direct electrolysis of a bath of manganese sulfate and sulfuric acid. The EMD is desirable since it has a high density and high purity. The electrical conductivity of EMD is fairly low. An electrically conductive material is added to the cathode mixture to improve the electric conductivity between individual manganese dioxide particles. Such electrically conductive additive also improves electric conductivity between the manganese dioxide particles and the cell housing, which also serves as cathode current collector. Suitable electrically conductive additives can include, for example, conductive carbon powders, such as carbon blacks, including acetylene blacks, flaky crystalline natural graphite, flaky crystalline synthetic graphite, including expanded or exfoliated graphite. The resistivity of graphites such as flaky natural or expanded graphites can typically be between about $3 \times 10^{-3}$ ohm-cm and $4 \times 10^{-3}$ ohm-cm.

It is desirable for a primary alkaline battery to have a high discharge capacity (i.e., long service life). Since commercial cell sizes have been fixed, it is known that the useful service life of a cell can be enhanced by packing greater amounts of the electrode active materials into the cell. However, such approach has practical limitations such as, for example, if the electrode active material is packed too densely in the cell, the rates of electrochemical reactions during cell discharge can be reduced, in turn reducing service life. Other deleterious effects such as cell polarization can occur as well. Polarization limits performance and service life. Although the amount of zinc or other active material included in the anode can be increased by decreasing the amount of electrolyte, there are practical limits since utilization of the anode active material, will begin to decrease as more active material is packed into the anode in relation to the alkaline electrolyte. Similarly, the amount of manganese dioxide or other active material included in the cathode typically can be increased by decreasing the amount of non-electrochemically active materials such as polymeric binder or carbon conductive additive, a sufficient quantity of conductive additive must be maintained to ensure an adequate level of bulk conductivity in the cathode.

Other problems associated with improving alkaline cell capacity and performance is to reduce the rate of zinc corrosion in the anode. The presence of alkaline electrolyte, typically potassium hydroxide, in the zinc anode gradually leads to production of zinc oxide (ZnO) deposits directly on the zinc particles and within the anode core. This eventually placates the effectiveness of remaining zinc, thus reducing zinc utilization and reduces the cell's overall electrochemical efficiency. The accumulation of zinc oxide deposit can eventually shut down the cell. A byproduct of the corrosion reaction is production of hydrogen gas which gradually raises the cell's internal pressure.

Although amalgamation of zinc particles with mercury is known to retard the rate of zinc corrosion reaction and reduce the rate of hydrogen gas production, modern alkaline cell generally contain zero added mercury, because of environmental regulations. In such case the total amount of mercury in the cell is less than about 100 parts by weight mercury per million parts by weight zinc, typically less than about 50 parts by weight mercury per million parts by weight zinc. The addition of surfactants to the anode mixture or alloying the zinc particles with metals such as indium, bismuth or aluminum have been used to replace the beneficial effect of mercury.

Although such alkaline cells are in widespread commercial use there is still a need to retard the rate of zinc corrosion and simultaneously improve cell's discharge capacity and service life. The improved cell must also be cost effective and exhibit reliable performance as well as high capacity (mAmp-hours) for normal applications such as flashlight, radio, and audio players.

SUMMARY OF THE INVENTION

The invention is directed to primary alkaline cells having zinc or zinc alloy particles in the anode. The cathode preferably comprises manganese dioxide. The electrolyte is preferably an aqueous solution of potassium hydroxide, but may also be an aqueous solution of other alkaline such as sodium or lithium hydroxide. The cell shape is typically cylindrical but may be other shapes, for example, having one or more sides which are substantially flat. Thus, by way of example, the cell may have a prismatic or rectangular (cuboid) shape. Cylindrical alkaline cell sizes may typically be standard AAAA (42×8 mm), AAA (44×9 mm), AA (49×12 mm), C (49×25 mm) and D (58×32 mm) size. The present invention is applicable to an alkaline cell having an anode comprising zinc or zinc alloy particles and preferably a cathode comprising manganese dioxide, irrespective of the cell shape or size.

In principal aspect the invention is directed to the addition of molecular sieves to the anode mixture of an alkaline cell wherein the anode comprises zinc or zinc alloy particles. The addition of small amounts of molecular sieves to the anode mixture comprising zinc or zinc alloy particles has been determined to increase the service life of the cell during normal usage. The zinc or zinc alloy particles typically have an average particle size between about 30 and 350 micron. The anode mixture comprises a slurry of zinc or zinc alloy particles, alkaline electrolyte, preferably aqueous potassium hydroxide, and gelling agent to which the molecular sieve additive of the invention is added. The cell typically contains no added mercury, that is, contains less than about 100 ppm (parts per million) mercury, typically less than 50 ppm mercury based on the weight of zinc. The cathode of such alkaline cell typically comprises manganese dioxide (EMD) and graphite particles. The molecular sieve additive comprises desirably between about 0.01 to 1 percent by weight of the total zinc in the anode mixture, desirably between about 0.1 and 1 percent by weight of the total zinc in the anode mixture. Preferably, the molecular sieves comprise about 1000 parts per million parts by weight (ppm) of the total zinc in the anode mixture, that is, about 0.1 percent by weight of the total zinc in the anode mixture. This converts to the molecular sieves comprising between about 0.007 and 0.7 percent by weight of the total anode. Desirably the molecular sieves comprise between about 0.07 and 0.7 percent by weight of the total anode.

The molecular sieve anode additive in the present invention can be a dehydrated aluminosilicate, preferably, a dehydrated alkali metal aluminosilicate. The term "molecular sieve" is well known in the art and it references a known principal class of material which are dehydrated aluminosilicates, more commonly referenced as alkali metal aluminosilicates. Such molecular sieves are crystalline aluminosilicates which may occur naturally in the class of minerals known as zeolites. The crystalline aluminosilicates may also be produced synthetically. Such aluminosilicates (natural or synthetic) have been heat treated at least once during manufacture or treatment to remove most water of hydration including at least the majority portion of water which can be otherwise naturally trapped, bound or adsorbed within the aluminosilicate structure.

The term "dehydrated" as used herein thus means that at least the majority portion of the water which can be bound within the aluminosilicate structure as water of hydration or otherwise naturally bound, trapped or adsorbed therein has been removed at least once, from the aluminosilicate or other type molecular sieve crystalline structure. Such water is typically removed from the aluminosilicate crystalline structure by "heat treating". Desirably at least the majority portion, typically substantially all (greater than 90%) of the water which can be bound, trapped, or adsorbed within the aluminosilicate is initially removed therefrom to form the molecular sieve material. This properly conditions and activates the pores and microscopic surfaces within molecular sieve structure. The molecular sieves have the property that they undergo dehydration with little or no change in crystalline structure.

It will be appreciated that during storage of molecular sieves some of the water of hydration may be reabsorbed into the molecular sieve crystalline structure. In normal circumstances reasonable precautions are taken not to expose the molecular sieves to high, humid environment for long periods or otherwise expose them to direct contact with liquid water (or other liquids) prior to use. Nevertheless, at least a small fraction of the water of hydration may become reabsorbed into the crystalline structure during lengthy storage periods. Such molecular sieves, which were "dehydrated" once during manufacture may be in a state of only "partial dehydration" just immediately prior to their admixture with aqueous alkaline electrolyte as used herein in zinc containing anode mixtures for alkaline cells. Thus, it will be appreciated that just immediately prior to contact with aqueous alkaline electrolyte, the state of the molecular sieve additive is that it is at least "partially dehydrated". That is, at least about 10 percent by weight, desirably at least about 20 percent by weight, preferably at least about 40 percent by weight of the water of hydration including other water which may be naturally trapped within the crystalline pores, is not present therein.

The dehydrated molecular sieve structure has a high adsorptive capability. The empty cavities in the molecular sieve's dehydrated structure has a strong tendency to recapture lost water molecules or other molecules that are small enough to fit into the small pore cavities within the molecular sieve structure. The class of materials which are dehydrated crystalline metal aluminosilicates forming molecular sieves as referenced in the present invention, for use as an anode additive for alkaline cells, have also been used in the chemical processing industries, for example, in packed bed towers to treat gas (extracting water and other impurities) and in drying organic liquids. The class of materials as referenced herein as "molecular sieves" is also represented by the descriptions and sample materials as given, for example, in Hersh, "Molecular Sieves", Reinhold, N.Y. (1961), incorporated herein by reference.

The molecular sieves are characterized by their high porosity with their pores (lattice vacancies) generally of "uniform" size and of molecular dimension. Only molecules, for example, water molecules, which are small enough to slip through the pores of the crystal will enter these cavities. Typical molecular sieves are dehydrated alkali metal aluminosilicates which contain one or more of sodium, potassium, or calcium in their crystalline structure. The pores (lattice openings) of such sodium, calcium, or potassium aluminosilicates forming molecular sieves upon dehydration may typically have a diameter of only between about 3 and 5 Angstrom, more typically between about 4 and 5 Angstrom. Other variations in chemical composition of the aluminosilicates as well as variations in crystalline structure may result in molecular sieves having larger pores, for example, up to 10 Angstrom or even up to 25 Angstrom pore sizes and somewhat larger. Thus, the range of average pore size (lattice openings) for molecular sieves to be employed in the invention hereof, that is, as additive to the zinc anode mixture of an alkaline cell, may be between about 3 and 25 Angstrom, preferably between about 3 and 5 Angstrom.

Representative molecular sieves for use in the present invention as an anode additive for alkaline cells having zinc anode, preferably in the context of a zinc/$MnO_2$ alkaline cell, are as follows. The following molecular sieves of the alkali metal aluminosilicate type have average (nominal) pore diameter between about 3 and 5 Angstrom: $K_{12}[(AlO_2)_{12}.(SiO_2)_{12}].xH_2O$ (3 Angstrom pore); $Na_{12}[(AlO_2)_{12}(SiO_2)_{12}].xH_2O$ (4 Angstrom pore); $Ca_{1.5}Na_3[(AlO_2)_{12}.(SiO_2)_{12}].H_2O$ (5 Angstrom pore).

Representative molecular sieves of larger pores for use in the present invention as an anode additive for alkaline cells having zinc anode, preferably in the context of a zinc/MnO2 alkaline cell are as follows. The following molecular sieve has average (nominal) pore diameter of about 10 Angstrom: $Na_{86}[(AlO_2)_{86}.(SiO_2)_{106}].xH_2O$ (10 Angstrom). Another class of molecular sieves is titanium oxide based molecular sieves, for example, of representative formula $TiO_2$ having nominal uniform pore diameter of about 25 Angstrom, which may be used beneficially in the present invention as anode additive for alkaline cells, preferably, zinc/MnO$_2$ alkaline cells. Mixtures of TiO$_2$ based molecular sieve particles wherein there is a group of individual particles of one uniform pore size and one or more other groups of TiO$_2$ molecular sieve particles of other uniform pore size, may be employed. Also mixtures of molecular sieves of different chemical composition and different nominal uniform pore size, e.g., from the above described representative types, may be added to the zinc anode mixture of the alkaline cell.

The molecular sieve additive to the alkaline cell anode comprising zinc or zinc alloy particles, particularly in the context of zinc/MnO$_2$ alkaline cell functions to retard the rate of buildup of zinc oxide deposits within the anode and thus extends the actual discharge capacity and service life of the cell.

BRIEF DESCRIPTION OF THE FIGURES

The FIGURE is a cross-sectional cut away view of an elongated cylindrical alkaline cell having the anode of the invention.

DETAILED DESCRIPTION

A representative alkaline cell 810 which can utilize the anode mixture of the invention is shown in the FIGURE. The alkaline cell 810 is preferably a primary (nonrechargeable) alkaline cell comprising a cylindrical casing 820 of steel, preferably nickel plated steel, having a closed end 814 and an open end 816. The cell is preferably filled with an anode mixture 815 comprising zinc anode active material and the molecular sieve (dehydrated aluminosilicate) additive of the invention, and a cathode mixture 812 comprising manganese dioxide cathode active material. (The terms anode active material and cathode active material as used herein means the chemical material in the anode and cathode, respectively, which undergoes electrochemical reaction during cell discharge.) The anode active material comprising zinc, desirably comprises between about 60 and 72 percent by weight of the anode mixture 815, preferably between about 62 and 71 percent by weight of anode mixture 815. Anode 815 comprises zinc particles, aqueous KOH electrolyte and the molecular sieve (dehydrated aluminosilicate) additive of the invention. The electrolyte in the anode comprises a conventional mixture of KOH, ZnO and gelling agent. The zinc serves as the anode active material. The zinc particles are preferably alloyed with indium and bismuth and may be additionally plated with indium or bismuth. The total indium and bismuth content are each preferably between about 100 and 1500 parts per million parts by weight zinc, preferably between about 150 and 1500 parts per million parts by weight zinc. These particulate zinc alloys are essentially comprised of pure zinc and have the electrochemical capacity essentially of pure zinc. Thus, the term "zinc" shall be understood to include such materials.

The cell preferably contains zero added mercury. Accordingly the mercury content is less than about 100 parts mercury per million parts by weight zinc, typically less than about 50 parts mercury per million parts by weight zinc. The cell also preferably does not contain any added amounts of lead and thus is essentially lead-free, that is, the total lead content is less than 30 ppm, desirably less than 15 ppm of the total zinc or total active metal content of the anode. The anode mixtures 815 can typically contain zinc particles, molecular sieves (dehydrated aluminosilicates) additive of the invention, aqueous KOH electrolyte solution, a gelling agent (e.g., an acrylic acid copolymer available under the tradename CARBOPOL C940 from B.F. Goodrich), and optional surfactants (e.g., organic phosphate ester-based surfactants available under the tradename GAFAC RA600 from Rhône Poulenc). Such an anode mixture is given only as an illustrative example and is not intended to restrict the present invention. Other representative gelling agents for zinc anodes are disclosed in U.S. Pat. No. 4,563,404.

The molecular sieves additive to the zinc anode mixture 815 are crystalline aluminosilicate materials belonging to the class of minerals known as zeolites. The zeolites are a natural or synthetic hydrated silicate of aluminum and one or more of sodium, potassium, or calcium. For example, the aluminosilicate containing sodium may typically be of the type Na$_2$O.Al$_2$O$_3$.nSiO$_2$.xH$_2$O. (See, Gessner G. Hawley, The Condensed Chemical Dictionary, 10$^{th}$ Ed., Van Nostrand Reinhold Company.) The molecular sieves which have particular utility as anode additive are crystalline alkali metal aluminosilicates (zeolites) which have been dehydrated, that is, heat treated at least once to remove most water of hydration. They are characterized by their high porosity with their pores (lattice vacancies) generally of "uniform" size and of molecular dimension. Molecular sieves are characterized by their precise, uniform, crystalline pore size.

For example, the pores (lattice openings) may typically have a diameter of only about 4 to 5 Angstrom for the sodium or calcium form of the aluminosilicate. The dehydration process to which the alkali metal aluminosilicates (or other molecular sieve structure) are exposed during manufacture or subsequent treatment, removes most water of hydration including most water which is otherwise trapped within the crystalline structure. The dehydration process conditions and "activates" the molecular sieve. The molecular sieves have the property that they undergo dehydration with little or no change in crystalline structure. The dehydrated molecular sieve structure has a high adsorptive capability. The empty cavities in the molecular sieve's dehydrated structure has a strong tendency to recapture lost water molecules or other molecules that are small enough to fit into the small pore cavities within the molecular sieve structure. Only molecules which are small enough to slip through the pores of the crystal will enter these cavities. Thus, molecular sieves have been used in the chemical processing industries, for example, in packed bed towers to treat gas (extracting water and other impurities) and in drying organic liquids and in separating very small molecules from much larger molecules.

In the present invention the molecular sieve additive to the zinc anode mixture 815 is a dehydrated alkali metal aluminosilicate of the type preferably containing sodium, potassium, or calcium (or any combination thereof, for example, both sodium and calcium). A preferred molecular sieve is of the sodium type aluminosilicate having the formula Na$_{12}$[(AlO$_2$)$_{12}$(SiO$_2$)$_{12}$].xH$_2$O and has an average (nominal) crystalline pore diameter (lattice openings) of about 4 Angstrom. Such molecular sieve is available under the trade designation Molecular Sieve Type 4A from UOP and may be ordered from the Aldrich Chemical Company.

Representative molecular sieves for use in the present invention as an anode additive for alkaline cells having zinc anode, preferably in the context of a zinc/MnO$_2$ alkaline cell, are as follows. The following molecular sieves of the alkali metal aluminosilicate type have average (nominal) pore diameter between about 3 and 5 Angstrom: K$_{12}$[(AlO$_2$)$_{12}$.(SiO$_2$)$_{12}$].xH$_2$O (3 Angstrom pore), available under the trade designation Molecular Sieve Type 3A from UOP; Na$_{12}$[(AlO$_2$)$_{12}$.(SiO$_2$)$_{12}$].xH$_2$O (4 Angstrom pore) available under the trade designation Molecular Sieve Type 4A from UOP;

$Ca_{1.5}Na_3[(AlO_2)_{12}.(SiO_2)_{12}].H_2O$ (5 Angstrom pore) available under the trade designation Molecular Sieve Type 5A from UOP.

Representative molecular sieves of larger pores for use in the present invention as an anode additive for alkaline cells having zinc anode, preferably in the context of a zinc/MnO2 alkaline cell are as follows. The following molecular sieve has average pore size of about 10 Angstrom: $Na_{86}[(AlO_2)_{86}.(SiO_2)_{106}].xH_2O$ (10 Angstrom) available under the trade designation Molecular Sieve Type 13X from UOP. Another class of molecular sieves is titanium oxide based molecular sieves of uniform pore size. That is, $TiO_2$ based molecular sieves of uniform pore size, for example, of nominal pore diameter of about 25 Angstrom, may be used beneficially in the present invention as anode additive for alkaline cells, preferably zinc/MnO₂ alkaline cells. Also mixtures of molecular sieves of different chemical composition and different average pore size, e.g., from the above described representative types, may be added to the zinc anode mixture of the alkaline cell.

Desirably the molecular sieves are present in the total anode mixture 815 in amount between about 0.01 to 1 percent by weight of the total zinc in the anode mixture. Preferably the molecular sieves comprise about 1000 parts per million parts by weight (ppm) of the total zinc in the anode mixture. This converts to the molecular sieves comprising between about 0.007 and 0.7 percent by weight of the total anode mixture. Desirably the molecular sieves comprise between about 0.07 and 0.7 percent by weight of the total anode mixture. The molecular sieves remain inert in the anode mixture, that is, they do not react chemically with the zinc particles. They may be obtained in powder form, typically having an average particle size between about 1 and 10 micron.

Without wishing to be bound by theory, it is believed that the presence of the molecular sieve additive to the anode mixture 815 functions to delay or retard the rate of conversion of zincate ions $[Zn(OH)_4]^{-2}$ to zinc oxide (ZnO) deposits. (The ZnO deposits formed in the anode upon cell discharge gradually corrodes the zinc particles, thus placates their effectiveness and reduces overall cell efficiency.)

It is not known with certainty why the presence of the molecular sieves improves performance of cells, but it is theorized to have a buffering effect, which serves to reduce the rate of change of hydroxyl ion concentration in the anode mixture. This is believed to retard the buildup of zinc oxide deposits in the anode. The utilization of zinc in the anode is improved which results in an increase in actual discharge capacity (mAmp-hrs). The adsorptive capacity of the micropores (lattice openings) within the molecular sieve crystal structure are theorized to reduce the rate of change in hydroxyl ion concentration in the anode. Without wishing to be bound by theory, it is believed that the beneficial effect of the molecular sieve additive in retarding the rate of zinc oxide (ZnO) deposit in the anode can be analyzed further in the context of the following basic anode reactions.

The basic alkaline cell reactions are as follows:

Anode $$Zn+2(OH)^-=Zn(OH)_2+2e^- \quad \text{Eq. 1}$$

$$Zn(OH)_2+2(OH)^-=[Zn(OH)_4]^{-2} \quad \text{Eq. 2}$$

$$[Zn(OH)_4]^{-2}=ZnO+H_2O+2(OH)^- \quad \text{Eq. 3}$$

Overall Anode Reaction: (Eq. 1+Eq. 2+Eq. 3)

$$Zn+2(OH)^-=ZnO+H_2O+2e^- \quad \text{Eq. 4}$$

Cathode $$2MnO_2+2H_2O+2e-=2MnO(OH)+2(OH)^- \quad \text{Eq. 5}$$

Overall Cell Reaction: (Eq. 4+Eq. 5)

$$Zn+2MnO_2+H_2O=ZnO+2MnO(OH) \quad \text{Eq. 6}$$

The initial electrochemical reaction is represented by Eq. 1 wherein zinc reacts with hydroxyl ions $(OH)^-$ to form zinc hydroxide $Zn(OH)_2$ which is a precipitant. But in high concentration (excess) hydroxide ions in the anode, typical environment in fresh alkaline cells, $Zn(OH)_2$ dissolves forming soluble zincate ions $[Zn(OH)_4]^{-2}$ by the reaction shown in Eq. 2. The zincate ions can build up in this manner to form a supersaturated solution in aqueous KOH based electrolyte. However, the zincate ions $[Zn(OH)_4]^{-2}$ gradually decompose upon continued cell discharge or storage. In particular upon continued cell discharge, the hydroxyl ions $(OH)^-$ content depletes in the anode because of the first two reactions (Eq. 1 and 2) and this in turn causes the zincate ions to decomposes at faster rate to form zinc oxide ZnO deposits (Eq. 3). That is, as the hydroxyl ion content in the anode continues to deplete the kinetics favors Eq. 3, resulting in a gradual increase in the rate of conversion of zincate ions to ZnO deposits (Eq. 3).

The ZnO gradually deposits onto the surface of the zinc particles to placate remaining (undischarged) particles and finally builds up to form a core of zinc oxide in the anode, which can eventually cause the cell to shut down. As a result of these mechanisms leading to the build up of ZnO deposits in the anode, the overall alkaline cell discharge efficiency even in normal usage, can be fairly low. For example, the actual capacity realized (mAmp-hrs) is typically between about 60 and 70% of theoretical capacity based on available zinc (cell balanced with $MnO_2$ in excess) within the range of medium current rates in intermittent discharge tests.

It has been discovered that the addition of small amounts of molecular sieves (dehydrated aluminosilicate) to the zinc anode mixture can improve performance of cells on intermittent discharge at medium rate, e.g. between about 0.2 and 0.4 Amp discharge. Desirably the molecular sieves (dehydrated aluminosilicate) is added to the anode in amount between about 100 to 10000 parts by weight molecular sieve to million parts by weight (ppm) total zinc in the anode, typically about 1000 parts by weight molecular sieve to million parts by weight (ppm) total zinc in the anode. This converts to the molecular sieves comprising between about 0.007 and 0.7 percent by weight of the total anode. Desirably the molecular sieves comprise between about 0.07 and 0.7 percent by weight of the total anode. The reduction in the rate of ZnO buildup in the anode as a result of the addition of the molecular sieve material to the anode mixture, results in an increase in zinc utilization. This in turn improves the actual discharge capacity (mAmp-hrs) for an alkaline cell in normal usage.

It is theorized that the reduction in rate of ZnO buildup and improvement in zinc utilization and cell discharge capacity (mAmp-hrs) because of the addition of the molecular sieves to the anode may be governed by the following mechanisms.

The presence of molecular sieves in the zinc anode mitigates the change in hydroxyl ion $(OH)^-$ concentration in the anode mixture during cell discharge. That is, it appears to have a buffering effect, which serves to reduce the rate of change of hydroxyl ion concentration in the anode mixture. This in turn delays the ZnO production from the decomposition of $[Zn(OH)_4]^{-2}$ as in the reaction of Eq. 3.

The anode mixture 815 desirably comprises: Zinc alloy powder 62 to 71 wt % (99.9 wt % zinc containing 200 to 1500 ppm indium as alloy and plated material, and 100 to 1000 ppm bismuth), molecular sieves (dehydrated aluminosilicates) additive between about 0.01 to 1 wt. %, an aqueous KOH solution comprising 33 to 38 wt % KOH and about 2 wt % ZnO; a cross-linked acrylic acid polymer gelling agent available commercially under the tradename "CARBOPOL C940" from B.F. Goodrich (e.g., 0.5 to 2 wt %) and a hydrolyzed polyacrylonitrile grafted onto a starch backbone commercially available commercially under the tradename "Waterlock A-221" from Grain Processing Co. (between 0.01 and 0.5 wt. %); dionyl phenol phosphate ester surfactant available commercially under the tradename "RA-600" from Rhone-Poulenc (50-200 ppm). The zinc alloy average particle size is desirably between about 30 and 350 micron. The bulk density of the zinc in the anode (anode porosity) is typically between about 1.75 and 2.2 grams zinc per cubic centimeter of anode.

The cathode mixture 812 comprises manganese dioxide (EMD) and a conductive carbon, preferably, graphitic material, desirably a flaky crystalline natural graphite or expanded graphite or mixture thereof. Cathode mixture 812 may also include graphitic carbon fibers or graphitic carbon nanofiber. The total conductive carbon in the cathode mixture desirably comprises between about 3 and 10 percent by weight of the cathode, preferably between about 4 and 10 percent by weight of the cathode. The cathode mixture 812 also desirably comprises between about 5 and 10 percent by weight of an aqueous solution of KOH, which preferably has a strength of between about 7 and 9 Normal (30 and 40 wt. % KOH and 2 wt. % ZnO).

The cathode active material, typically comprising manganese dioxide (EMD), comprises between about 80 and 92 percent by weight of the cathode mixture 812, preferably between about 80 and 90 percent by weight of the cathode mixture 812. The cathode 812 can desirably have the following composition: 87-93 wt % of electrolytic manganese dioxide (e.g., Trona D from Kerr-McGee), 2-6 wt % (total) of graphite, 5-7 wt % of a 7-10 Normal aqueous KOH solution having a KOH concentration of about 30-40 wt %; and 0.1 to 0.5 wt % of an optional polyethylene binder. The electrolytic manganese dioxide typically has an average particle size between about 1 and 100 micron, desirably between about 20 and 60 micron. The graphite is typically in the form of natural, or expanded graphite or mixtures thereof. The graphite can also comprise graphitic carbon nanofibers alone or in admixture with natural or expanded graphite. Such cathode mixtures are intended to be illustrative and are not intended to restrict this invention.

The term "graphite" or "graphitic material" as used herein shall include natural and synthetic crystalline graphites (synthetically prepared or processed graphite), expanded graphites, graphitic carbons, and graphitic carbon fibers. The natural or expanded graphite is preferably in particulate form having a mean average particle size desirably between about 0.5 micron and 50 micron, typically between about 10 micron and 50 micron. A graphitic carbon has the characteristics of an ordered three-dimensional graphite crystalline structure consisting of layers of hexagonally arranged carbon atoms stacked parallel to each other as determined by X-ray diffraction. As defined in International Committee for Characterization and Terminology of Carbon (ICCTC, 1982), published in the *Journal Carbon*, Vol. 20, p. 445, a graphitic carbon embraces the varieties of substances consisting of elemental carbon in allotropic form of graphite irrespective of structural defects. The term graphitic carbon as used herein shall be construed in this manner.

The cathode mixture 812 includes manganese dioxide (EMD) powder, and aqueous KOH electrolyte solution. A small amount of binder, e.g., less than about 0.5 wt % polyethylene binder, may optionally be added to the mixture. The cathode mixture can be prepared wet, with aqueous KOH electrolyte included before the mixture is inserted into the cell. For example, the casing 820 can be filled with the cathode mixture and the central portion of the cathode mixture can be excavated leaving the annular cathode 812 as shown in the FIGURE. The wet cathode mixture can be compacted while in the cell. Alternatively, the wet mixture can be compacted into disks 812*a* before insertion into the cell and then, optionally, additionally compacted while in the cell. Alternatively, the cathode mixture 812 can be prepared by first dry mixing the magnesium dioxide powder and graphitic carbon material. The dry mixture can be compacted into the cell casing 820 or can be compacted into disk shaped blocks 812*a*, which can be inserted into the cell in stacked arrangement. A separator sheet 890 can be placed against the inside surface of cathode disks 812*a*. Separator 890 can be of cellulosic film or a film formed of nonwoven material comprising polyvinylalcohol and rayon fibers. Separator 890 can be of a single layer of such nonwoven material or can be a composite having an outer layer of cellophane adhered to the nonwoven material. The nonwoven material can typically contain between about 60 weight percent to 80 weight percent polyvinylalcohol fibers and between about 20 and 40 weight percent rayon fibers. Separator 890 can be positioned so that the cellophane layer is adjacent either cathode 812 or anode 815. The above described separators are known and have been used in connection with conventional zinc/MnO$_2$ alkaline cell and are also suitable for use in the present alkaline cell 810. Aqueous KOH electrolyte can be poured over the dry cathode wherein it becomes absorbed into the separator and cathode. The anode material 815 can then be added to the cell.

The anode and cathode can be separated by a conventional ion porous separator 890, for example, comprising polyvinylalcohol and cellulosic fibrous material. After cell 810 is filled an insulating plug 860 is inserted into open end 816. Insulating plug 860 may be of polypropylene, talc filled polypropylene, sulfonated polyethylene or nylon. Plug 860 can have a thinned portion 865 therein typically of a small circular, oval or polygonal shape. Thinned portion 865 functions as a rupturable membrane which can be designed to rupture thereby releasing excessive gas within the cell. This guards against excessive buildup of gas pressure within the cell, for example, if the cell is subjected to excessive heat or abusive operating conditions. The plug 860 is preferably snap fitted around circumferential step 818 as shown in the FIGURE so that the plug locks in place into the open end 816. The peripheral edge 827 of casing 820 is crimped over the top of insulating plug 860. A paper insulating washer 880 is applied over the crimped peripheral edge 827 of casing 820. Insulating washer 880 can be a polyethylene coated paper washer. A terminal end cap 830 is welded to the head of current collector 840. An elongated current collector 840 is then inserted (force fitted) into aperture 844 of insulating plug 860 so that end cap 830 comes to rest against insulating washer 880. Current collector 840 can be selected from a variety of known electrically conductive metals found to be useful as current collector materials, for example, brass, tin plated brass, bronze, copper or indium plated brass. The current collector 840 used in the test cells was of tin plated brass. Conventional asphalt sealant may be preapplied around the current collector 840 before it is inserted into aperture 844. A film label 870 is applied around casing 820. The terminal end cap 830 becomes the negative terminal of alkaline cell 810 and pip 825 at the closed end of casing 820 becomes the positive terminal.

The representative cell 810 shown in the FIGURE can be an AA cell (50×14 mm). However, the alkaline cell shown in the FIGURE is not intended to be restricted to any particular size. Thus, the present invention is applicable to AAA (44×9 mm), C (50×25 mm), and D (58×32 mm) size cylindrical alkaline cells as well as AAAA size (42×8 mm) and button size alkaline cells of any size or shape.

Zn/MnO$_2$ Alkaline Cell Anode and Cathode

Composition and Performance Tests

Test AA size alkaline cells were made with anode mixture 815 comprising zinc and molecular sieve additive and a cathode 815 comprising MnO$_2$ (EMD). Comparative same size alkaline cells having same cathode composition and essentially the same anode mixture except that the anode of the comparative cell did not contain any molecular sieve additive. The comparative cell and test cells contained zero added mercury. The comparative cells (Comparative Example) and the test cells of Test Example 1 and 2 were balanced so that the balance ratio, namely, theoretical capacity of the MnO2 (based on 370 mAmp-hr per gram MnO$_2$) divided by the mAmp-hr capacity of zinc (based on 820 mAmp-hr per gram zinc) was 1.05.

The comparative and test cells in the following examples were discharged intermittently at cycles of:
a) 3.9 Ohm load for 1 hour followed by 23 hours rest, until a cutoff voltage of 0.8 Volts was reached.
b) 0.25 A discharge current for 1 hour followed by 23 hours rest, until a cutoff voltage of 0.9 Volts was reached.
Such intermittent discharge simulates typical usage of common electronic devices which employ alkaline cells. The actual service hours total was then recorded for each of the above discharge tests.

The comparative and test Cell anode and cathode compositions and test results are as follows:

COMPARATIVE EXAMPLE

Comparative Cell

A comparative test cell 810 of cylindrical configuration was prepared. The cell as defined by the casing outside dimensions was of about AA size and had a length of about 50.4 mm and a diameter of about 14.3 mm. The anode 815 and cathode 812 had the following composition.

| Anode Composition: | Wt. % |
| --- | --- |
| Zinc[1] | 69.0 |
| Electrolyte[2] (35.5% KOH, 2% ZnO) | 31.00 |
| | 100.00 |

Notes:
[1]The zinc particles had a mean average particle size of about 294 micron and were alloyed and plated with indium and bismuth to yield a total indium and bismuth content of about 150 and 230 ppm, respectively.
[2]The electrolyte solution contained gelling agents Waterlock A221 and Carbopol C940 comprising in total about 0.5 wt. % of the anode composition.

| Cathode Composition: | Wt. % |
| --- | --- |
| MnO$_2$ (EMD) (Trona D from Kerr McGee) | 88.7 |
| Graphite[1] BNB90 expanded Graphite from Timcal Co. | 4.4 |
| Electrolyte (8.7 Normal KOH) | 6.9 |
| | 100.0 |

The cell's casing 820 had a wall thickness of 0.254 mm. The cell's anode and cathode was balanced so that the theoretical capacity of the MnO$_2$ (based on 370 mAmp-hr per gram MnO$_2$) divided by the mAmp-hr capacity of zinc (based on 820 mAmp-hr per gram zinc) was 1.05. The anode had 4.416 grams zinc. (The cathode had 10.280 grams MnO$_2$.)

The cell was discharged intermittently at cycles of 3.9 Ohm load for 1 hour followed by 23 hours rest, until a cutoff voltage of 0.8 Volts was reached. The actual service life was (7.78±0.04) service hours. Another identical fresh cell was prepared and discharged intermittently at cycles of 0.25 Amp load for 1 hour followed by 23 hours rest, until a cutoff voltage of 0.9 Volts was reached. The actual service life was (8.74±0.06) service hours.

Test Cell Example 1

A test cell 810 of cylindrical configuration and of same size as in the comparative example was prepared. The anode and cathode had the following composition.

| Anode Composition: | Wt. % |
| --- | --- |
| Zinc[1] | 68.9 |
| Molecular Sieve[2] | 0.1 |
| Electrolyte[3] (35.5% KOH, 2% ZnO) | 31.0 |
| | 100.0 |

Notes:
[1]The zinc particles had a mean average particle size of about 294 micron and were alloyed and plated with indium and bismuth to yield a total indium and bismuth content of about 150 and 230 ppm respectively.
[2]4Å (4 Angstrom pore) Molecular Sieve of formula Na$_{12}$[(AlO$_2$)$_{12}$(SiO$_2$)$_{12}$]·$x$H$_2$O from Aldrich Chemical Co.
[3]The electrolyte solution contained gelling agents Waterlock A221 and Carbopol C940 comprising in total about 0.5 wt. % of the anode composition.

| Cathode Composition: | Wt. % |
| --- | --- |
| MnO$_2$ (EMD) (Trona D from Kerr McGee) | 88.7 |
| Graphite[1] BNB90 expanded Graphite from Timcal Co. | 4.4 |
| Electrolyte (8.7 Normal KOH) | 6.9 |
| | 100.0 |

The cell's casing 820 had a wall thickness of 0.254 mm. The cell's anode and cathode was balanced so that the theoretical capacity of the MnO$_2$ (based on 370 mAmp-hr per gram MnO$_2$) divided by the mAmp-hr capacity of zinc (based on 820 mAmp-hr per gram zinc) was 1.05. The anode had 4.416 grams zinc. (The cathode had 10.280 grams MnO$_2$.)

The test cell was discharged intermittently at cycles of 3.9 Ohm load for 1 hour followed by 23 hours rest, until a cutoff voltage of 0.8 Volts was reached. The actual service life was (8.61±0.09) service hours. Another identical fresh test cell was prepared and discharged intermittently at cycles of 0.25 Amp load for 1 hour followed by 23 hours rest, until a cutoff voltage of 0.9 Volts was reached. The actual service life was (9.28±0.01) service hours.

Test Cell Example 2

A test cell 810 of cylindrical configuration and of same size as in the comparative example was prepared. The anode and cathode had the following composition.

| Anode Composition: | Wt. % |
|---|---|
| Zinc[1] | 68.90 |
| Molecular Sieve[2] | 0.05 |
| Electrolyte[3] | 31.05 |
| (35.5% KOH, 2% ZnO) | |
| | 100.00 |

Notes:
[1] The zinc particles had a mean average particle size of about 294 micron and were alloyed and plated with indium and bismuth to yield a total indium and bismuth content of about 150 and 230 ppm respectively.
[2] 4Å (4 Angstrom pore) Molecular Sieve of formula $Na_{12}[(AlO_2)_{12}(SiO_2)_{12}] \cdot xH_2O$ from Aldrich Chemical Co.
[3] The electrolyte solution contained gelling agents Waterlock A221 and Carbopol C940 comprising in total about 0.5 wt. % of the anode composition.

| Cathode Composition: | Wt. % |
|---|---|
| $MnO_2$ (EMD) (Trona D from Kerr McGee) | 88.7 |
| Graphite[1] BNB90 expanded Graphite from Timcal Co. | 4.4 |
| Electrolyte (8.7 Normal KOH) | 6.9 |
| | 100.0 |

The cell's casing 820 had a wall thickness of 0.254 mm. The cell's anode and cathode was balanced so that the theoretical capacity of the $MnO_2$ (based on 370 mAmp-hr per gram $MnO_2$) divided by the mAmp-hr capacity of zinc (based on 820 mAmp-hr per gram zinc) was 1.05. The anode had 4.416 grams zinc. (The cathode had 10.280 grams $MnO_2$.)

The test cell was discharged intermittently at cycles of 3.9 Ohm load for 1 hour followed by 23 hours rest, until a cutoff voltage of 0.8 Volts was reached. The actual service life was (8.65±0.02) service hours. Another identical fresh test cell was prepared and discharged intermittently at cycles of 0.25 Amp load for 1 hour followed by 23 hours rest, until a cutoff voltage of 0.9 Volts was reached. The actual service life was (9.29±0.02) service hours.

Discussion of the Test Results

The test cells (Example 1 and 2) utilizing molecular sieve additive to the zinc anode exhibited an increase in service life for the 3.9 ohm load intermittent discharge test compared to the comparative cell (without molecular sieve additive.) The results for this test showed an improvement from 7.78 service hours (comparative cell) to 8.61 hours (Example 1 with molecular sieves) and to 8.65 service hours (Example 2 with molecular sieves).

The test cells (Example 1 and 2) utilizing molecular sieve additive to the zinc anode exhibited an increase in service life for the 0.25 Amp load intermittent discharge test compared to the comparative cell (without molecular sieve additive.) The results for this test showed an improvement from 8.74 service hours (comparative cell) to 9.28 service hours (Example 1 with molecular sieves) and to 9.29 service hours (Example 2 with molecular sieves).

Such improvement in service life for the alkaline cell as a result of the addition of small amount of molecular sieves to the anode mixture is considered to be significant.

Although the invention has been described with reference to specific embodiments, it should be appreciated that other embodiments are possible without departing from the concept of the invention. Thus, the invention is not intended to be limited to the specific embodiments but rather its scope is reflected by the claims and equivalents thereof.

What is claimed is:

1. A primary aqueous alkaline cell comprising an anode mixture comprising zinc particles and aqueous alkaline electrolyte; and a cathode mixture comprising cathode active material; wherein the anode mixture further comprises a zeolite that is in a dehydrated state before being placed in admixture with said anode mixture comprising anode active material, the zeolite comprising between about 0.007 and 0.7 percent by weight of said anode mixture.

2. The alkaline cell of claim 1 wherein the zeolite comprises crystalline aluminosilicate material.

3. The alkaline cell of claim 1 wherein the zeolite consists essentially of crystalline alkali metal aluminosilicate material.

4. The alkaline cell of claim 1 wherein the zeolite comprises between about 0.07 and 0.7 percent by weight of said anode mixture.

5. The alkaline cell of claim 2 wherein said crystalline aluminosilicate material has an average pore diameter of between about 3 and 25 Angstrom.

6. The alkaline cell of claim 2 wherein said crystalline aluminosilicate material has an average pore diameter of between about 3 and 5 Angstrom.

7. The alkaline cell of claim 2 wherein said crystalline aluminosilicate material comprises sodium chemically bound within the aluminosilicate crystalline structure.

8. The alkaline cell of claim 2 wherein said crystalline aluminosilicate material comprises calcium chemically bound within the aluminosilicate crystalline structure.

9. The alkaline cell of claim 2 wherein said crystalline aluminosilicate material comprises potassium chemically bound within the aluminosilicate crystalline structure.

10. The alkaline cell of claim 1 wherein the zinc particles include zinc alloy particles comprising zinc alloyed with indium.

11. The alkaline cell of claim 10 wherein the zinc alloy particles comprising between about 100 and 1500 parts by weight indium per million parts by weight zinc in said zinc alloy particles.

12. The alkaline cell of claim 1 wherein said zinc particles in the anode mixture have an average particle size between about 30 and 350 micron.

13. The alkaline cell of claim 1 wherein said alkaline cell comprises less than 100 parts by weight mercury per million parts by weight zinc.

14. The alkaline cell of claim 1 wherein said alkaline cell comprises less than 30 parts by weight lead per million parts by weight zinc.

15. The alkaline cell of claim 1 wherein the cathode active material comprises manganese dioxide.

* * * * *